United States Patent [19]
Canadas

[11] Patent Number: 4,904,013
[45] Date of Patent: Feb. 27, 1990

[54] MOVABLE SUN VISOR

[75] Inventor: Jean C. Canadas, Remiremont, France

[73] Assignee: Rockwell-Cim Societe Anonyme, Rupt-sur-Moselle, France

[21] Appl. No.: 348,563

[22] Filed: May 5, 1989

[30] Foreign Application Priority Data

May 5, 1988 [FR] France .................. 88 06056

[51] Int. Cl.$^4$ .............................................. B60J 3/02
[52] U.S. Cl. .................. 296/97.4; 296/97.8; 296/97.11
[58] Field of Search ............... 296/97.4, 97.8, 97.9, 296/97.11

[56] References Cited

U.S. PATENT DOCUMENTS

| | | | |
|---|---|---|---|
| 2,877,050 | 3/1959 | Isola et al. | 296/97.8 |
| 2,922,676 | 1/1960 | Czajkowski | 296/97.8 |
| 3,226,152 | 12/1965 | Reuther | 296/97.4 |
| 4,205,873 | 6/1980 | Viertel et al. | 296/97.11 |
| 4,697,843 | 10/1987 | Tomforde | 296/97.4 |

Primary Examiner—Robert R. Song
Attorney, Agent, or Firm—Toren, McGeady & Associates

[57] ABSTRACT

Movable sun visor (10) which is supported in a carriage shape via front and rear pair of bearing points (12, 13) in lateral guide grooves. The length and the curvature pattern of the guide grooves is selected such that the sun visor (10) can be rapidly transferred from the out-of-use position to the in-use position. However, a shock effect on the drive can be caused thereby. It is therefore proposed that the guide curve for the front pair of bearing points (12) has an S-shaped course, the guide curve has a convex curvature in the first path segments and a concave curvature in the last path segments, and the guide curve for the rear pair of bearing points (13) has a convex curvature over the entire length of the curve.

14 Claims, 5 Drawing Sheets

| | | s | | | $t_B$ | $v_C$ | | s' | | | | |
|---|---|---|---|---|---|---|---|---|---|---|---|---|
| "n" | | A | B | C | | | $A'=\frac{n}{a}$ | B' | C' | $\frac{A}{B}$ | $\frac{A}{C}$ |
| "a" | 0-1 | 3,8 | 3,8 | 4,0 | 3,8 | 1,05 | 1 | 1 | 1 | 1 | 0,95 |
| "b" | 1-2 | 4,4 | 4,1 | 9,0 | 4,1 | 2,2 | 1,15 | 1,07 | 2,25 | 1,07 | 0,48 |
| "c" | 2-3 | 3,4 | 3,9 | 9,0 | 3,9 | 2,3 | 0,89 | 1,026 | 2,25 | 0,87 | 0,37 |
| "d" | 3-4 | 1,4 | 1,2 | 2,9 | 1,2 | 2,4 | 0,368 | 0,315 | 0,725 | 1,16 | 0,48 |
| "e" | 4-5 | 1,6 | 0,8 | 7,5 | 0,8 | 9,4 | 0,42 | 0,21 | 1,875 | 2 | 0,21 |
| "f" | 5-6 | 1,8 | 0,5 | 9,6 | 0,5 | 19,2 | 0,47 | 0,131 | 2,4 | 3,6 | 0,18 |
| "g" | 0-3 | 11,8 | 11,8 | 22,0 | 11,8 | 1,86 | | | | | |
| "h" | 3-6 | 4,6 | 2,5 | 20,0 | 2,5 | 8,0 | | | | | |
| "i" | 0-6 | 16,4 | 14,3 | 42,0 | | | | | | | |

MOVABLE SUN VISOR

BACKGROUND OF THE INVENTION

This invention relates to a movable sun visor.

A known type consists of a sun visor body which is supported in a carriage shape in side edge guide curves via a rear pair of bearing points, the two bearing points of which are oppositely formed at the lateral edges in the area of the rear edge of the sun visor body, and a front pair of bearing points, the two bearing points of which are oppositely formed at the lateral edges between the rear pair of bearing points and the front edge of the sun visor body, the two equal guide curves for the bearing points of the front pair of bearing points differing in the pattern of curvature and the length of the two equal guide curves for the bearing points of the rear pair of bearing points, and the guide curve for the front pair of bearing points being longer than the guide curve for the rear pair of bearing points.

Such a movable sun visor is known from DE-OS 35 12 807. The front and rear pairs of bearing points of the known sun visor move in very nearly straight-line guide curves, which have a greater curvature in the areas of the initial and final positions. The superposition of the two guide curves produces for the front edge of the sun visor body a sequence of movement in which firstly a segment of movement is accomplished essentially parallel to the windscreen of a motor vehicle and swivelling movement away from the windscreen into the in-use position then takes place. The greatest dazzle shielding effect of the sun visor body occurs when the sun visor body is swivelled away from the windscreen. When the sun visor body is transferred from the out-of-use position to the in-use position, the greatest dazzle shielding effect is achieved with a delay in time, because the path distance of the front edge of the sun visor body parallel to the windscreen first has to be run through. However, it is necessary for the greatest dazzle shielding effect of the sun visor body to occur very rapidly without time delays.

Another movable sun visor is known from DE-PS 27 24 414, the front pair of bearing points of which is moved on a circular path and the rear pair of bearing points of which is moved on a straight or slightly convexly curved path curve. The superposition of the two guide curves produces for the front edge of the sun visor body a direct downward swivelling with a subsequent swivelling movement in the direction of the windscreen. With the variable sun visor according to DE-PS 27 24 414, a shielding effect is thus achieved in a very short time and without unnecessary delays. A disadvantage in this sequence of movement is that in particular when the sun visor body is motor-operated—which was proposed in DE-OS 32 12 807— excessive distraction and startling of the drive of the motor vehicle can occur if the front edge of the sun visor body drops down very nearly in a straight line and in the manner of a blind.

A sun visor is also known from DE-OS 32 27 719 in which the front and rear pairs of bearing points move in common guide curves which have the same curvature and length. A bar which has the bearing points which run in the guide curves at its free ends engages in the central area of the sun visor body. The attachment of the sun visor body in the central area proves particularly disadvantageous in an accident, because in the event of collision with the head a substantial danger of injury can arise which cannot be compensated for by cushioning by the material of the sun visor.

SUMMARY OF THE INVENTION

The object of the invention is therefore to create a movable sun visor, the front edge of which can be rapidly moved into a position with a great dazzle shielding effect, the distraction and startling of the driver, particularly when the sun visor is motor-operated, being avoided.

According to the present invention, there is provided a movable sun visor consisting of a sun visor body, which is supported in a carriage in lateral side guide curves via a rear pair of bearing points which are oppositely formed at the lateral edges in the area of a rear edge of the sun visor body, and a front pair of bearing points, which are oppositely formed at the lateral edges between the rear pair of bearing points and a front edge of the sun visor body, there being two equal guide curves for the front pair of bearing points which differ in the pattern of curvature of and being longer than two equal guide curves which are provided for the rear pair of bearing points, and the first pair of guide curves for the front pair of bearing points follows an S-shaped course withh a convex curvature in a first set of path segments, and a concave curvature in a second set of path segments, and the second pair of the guide curves for the rear pair of bearing points has a convex curvature over the entire length of the curve, wherein the greatest curvature of the guide curve for the rear pair of bearing points is formed in a set of path segments, which correspond to the second set of path segments on the guide curve for the front pair of bearing points.

With the present sun visor, the path curve for the front edge of the sun visor body consists of two segments, the first segment stretching from the initial position of the front edge of the sun visor body to a turning point and corresponding to the actual extending movement e.g. from a lining shell. The second path curve segment stretches from the turning point to the final point of the front edge of the sun visor body and corresponds to the swivelling alignment of the sun visor in the direction of the windscreen. The first path segment, which stretches to the turning point, has a convex curvature. The greatest curvature adjoins the initial position of the front edge and then passes over into a slighter, downward pointing convex curvature. The sharp convex initial curvature is mainly effected by the first S-shaped segment of arc of the guide curve for the front pair of bearing points. The driver thus advantageously sees the front edge on extension initially pointing away from him and then dropping downwards with increasing speed. The impression of startle-inducing dropping of the sun visor body is consequently avoided.

The path curve course of the front edge of the sun visor body also allows the sun visor body to be accommodated largely concealed in a lining shell. Extension of the sun visor body from the lining shell is possible without a large exit opening in the lining shell.

Owing to the swung course of the guide curves, the bearing points can be moved without tilting and jamming in the individual path curve segments. The sun visor body can also be readily set in motion from the stationary condition in the out-of-use position owing to the small initial rise of the guide curves. The course of the guide curve according to a further development is in particular suitable for motor-controlled movement of the sun visor body.

According to an embodiment, the curve paths for the bearing points intersect. The guide curve for the front pair of bearing points for the starting point to the point of intersection runs above the guide curve for the rear pair of bearing points. In conjunction with the shallow slope of curve at the start of the guide curve, a movement in the direction of the windscreen results for the front edge of the sun visor body for a short section of path. The pattern of movement of the front edge of the sun visor body does not undergo a pronounced change in direction until the area of the point of intersection according to the segment of path with a highly convex curvature, adjoining which is a path segment with a slight curvature. The intersection of the guide curves also to an increased extent avoids the driver gaining the startling impression that the sun visor body might strike him in the face. It is likewise possible for the driver to visually estimate the change of direction as part of a harmonious movement and pre-determine it better than if the front edge essentially moves vertically downwards in an abrupt manner. Alongside the advantages described previously, the course followed by the guide curves for the front and rear pairs of bearing points offer the advantage that the position of the curves in relation to each other and the course of the individual curvature segments can be readily changed, in order to adapt the sun visor to vehicles with a different angle of inclination between roof and windscreen.

BRIEF DESCRIPTION OF THE DRAWINGS

For a better understanding of the invention and to show how the same may be carried into effect, reference will now be made, by way of example, to the accompanying drawings, in which.

DESCRIPTION OF PREFERRED EMBODIMENTS

Figure 1:
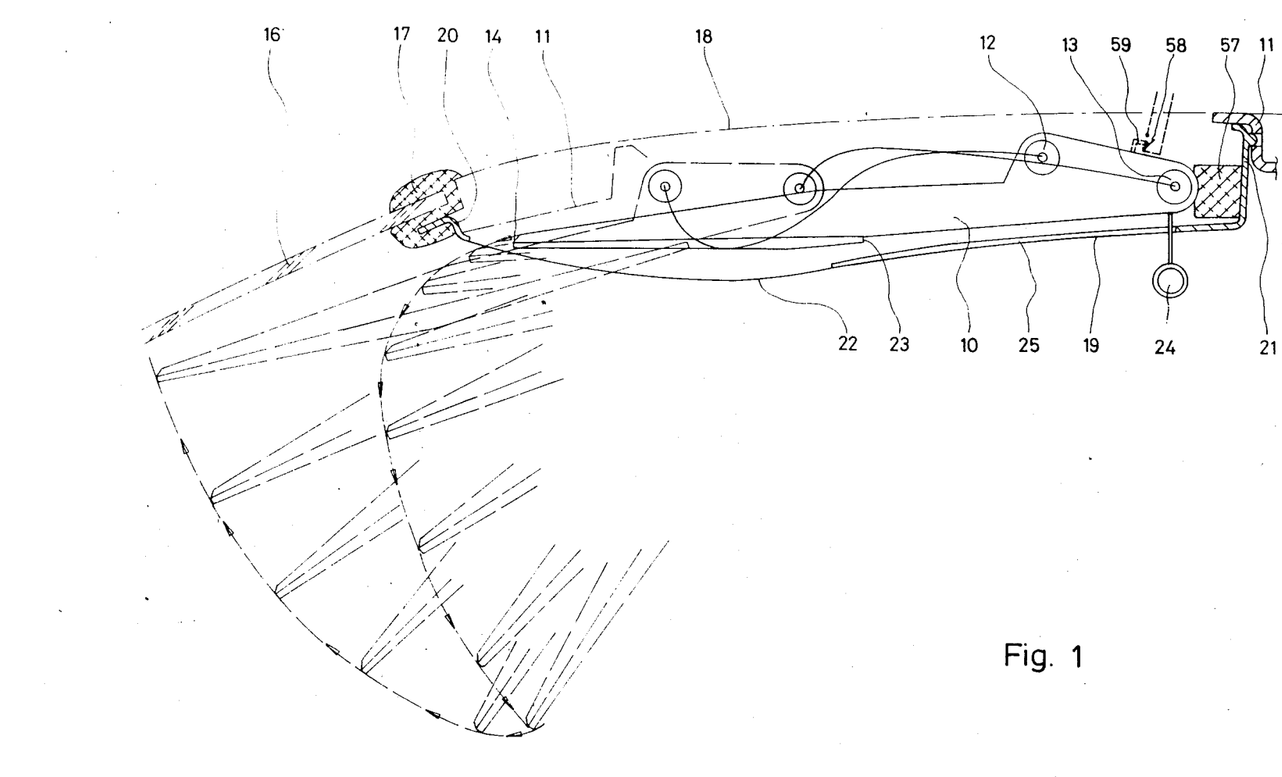
FIG. 1 is a cross-section through a roof area of a motor vehicle with a sun visor.

FIG. 1 shows a cross-section through a roof area of a motor vehicle with a sun visor 10. The sun visor 10 is formed in the area in which the car roof 18 adjoins the windscreen 16 via a rubber seal 17. The windscreen 16 and the car roof 18 and cross beam 11 are represented by a dash-dot line in FIG. 1. The sun visor 10 is in the out-of-use position and as illustrated in FIG. 1 is covered by a lining shell 19. The lining shell is suspended with its front end 20 in the rubber seal 17. The front end 20 of the lining shell 19 has for example a clip for this purpose which engages in a slit of the rubber seal 17. The lining shell 19 is additionally secured with its rear end 21 on another roof cross beam 11, for example by screw joints. The lining shell 19 has an exit opening 22 in the front area for the sun visor 10. The sun visor 10 is supported by two bearing points 12, 13 which are formed at the rear end of the sun visor 10. The bearing point 12 is located ahead of bearing point 13. The bearing point 12 is therefore referred to below as the front bearing point and the bearing point 13 as the rear bearing point.

If the sun visor 10 is moved from its out-of-use position, the tip 14 of the sun visor firstly passes through the exit opening 22 in the wall of the lining shell. The individual guide curves in which the bearing points 12, 13 run and the guide path on which the tip 14 of the sun visor moved are examined below under FIG. 2A. The sequence of movement of the sun visor 10 described below is equally suitable for manual operation and automatic operation with a motor. A handle or a strap 24 is provided, by way of example, for manual operation according to FIG. 1, engaging on the rear bearing point 13 of the sun visor 10. A slit 25 is provided in the wall of the lining shell 19 so that the handle protruding from the lining shell 19 or the strap 24 is mobile in the wall of the lining shell 19. Compared with a rigid handle 24 a flexible strap proves particularly advantageous because the direction of pull can be more easily adapted to the movement of the rear of the sun visor body. As further indicated in FIG. 1, the front area of the sun visor 10 can be so offset in relation to the interior rear area of the sun visor 10 via a shoulder 23 that a shoulder 23 abuts the edge of the exit opening 22 of the lining shell 19 in the out-of-use position. The transition from the lining shell 19 to the bottom of the sun visor 10 recognisable in the exit opening 22 can thus terminate flush. The front end 20 of the lining shell 19 can likewise be shaped such that the sun visor 10 terminates flush with the tip 14 in the out-of-use position. The bottom of the sun visor 10 which fills the exit opening 22 can additionally be adapted to the curvature of the lining shell 19, so that a uniform surface is visually obtained apart from the separating lines if the sun visor 10 is positioned in the out-of-use position.

It is advantageous to provide a rubber buffer as a stop in order to reduce noise when the final positions of the sun visor 10 are reached. A rubber buffer 57 is illustrated by way of example in FIG. 1 which comes into use when the sun visor 10 moves back from the in-use position to the final position in the out-of-use position. Rubber buffers 57 for the final position from the movement from the out-of-use position into the in-use position are not illustrated, in the interests of greater clarity. Flexible rubber buffers 57 in conjunction with limit switches are suitable as a replacement for slip couplings, particularly in automatic motor operation. A limit switch 58, which engages on the sun visor 10 in the final position with a cam 59 is shown in FIG. 1 by a broken line. If the sun visor 10 is run into the final position, the flexible rubber buffer 57 produces sufficient play for the switch 58 to open reliably via the cam 59. The rubber buffer 57 thus cause a gentle impact and the distance over which the rubber buffer 57 can be pressed back represents a simple adjustment of the switching point of the switch 58. Without the rubber buffer 57 the switching point of the switch 58 would have to be determined very precisely, although it is not possible to prevent the sun visor 10 due to inertia striking noisily on the parts which determine the final position. At the same time the displacement distance which results from the compression of the rubber buffer 57 has the result that the motor (not illustrated in FIG. 1) can come to a halt with a gentle transition.

Figure 2A:
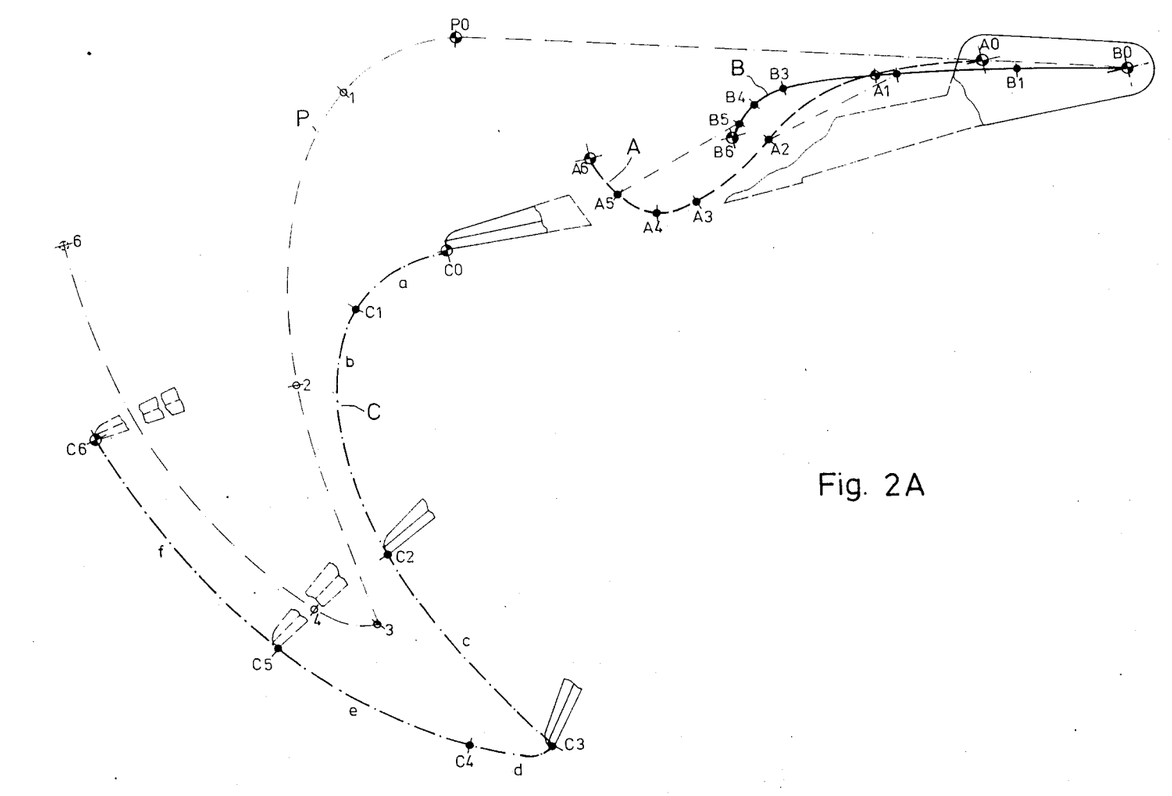
FIG. 2A shows guide curves in accordance with the invention of the bearing points and the path of movement of the top of the sun visor from the position shown in FIG. 1.

FIG. 2A shows four path curves. The guide curve in accordance with the invention, on which the front bearing point 12 of the sun visor 10 moves, is designated by A. The guide curve B in accordance with the invention characterises the path of movement of the rear bearing point 13. To each point on guide curve A a corresponding point on the guide curve B can be determined through the fixed distance which the two bearing points 12 and 13 have in relation to each other. If for example the front bearing point 12 is at point A3 on the guide curve A, the rear bearing point 13 on the guide curve B occupies the position in the curve point B3. In the same way seven further curve points from A0 to A6 and B0 to B6 are drawn in in FIG. 2A. The guide curves A and B are what are referred to as open guide curves, because the bearing points cannot be returned to the initial positions A0 and B0 via a cyclical movement. In order to transfer the bearing points 12, 13 from the position of the out-of-use position (A0 and B0) of the sun visor to the final position of the in-use position (A6 or B6), the curve path points A0 to A6 must be passed through. All the curve points would have to be passed through in the reverse order to the extending movement from A6 to A0 or B6 to B0 to move the sun visor 10 back.

The tip 14 of the sun visor 10 moves on a movement path C (third path curve). The movement path C represents the sum of the superposition of the two guide curves A and B. As well as the superposition of the two guide curves A and B, the path curve C is determined by the distance of the tip 14 from the bearing points 12 and 13. I.e. the distance of the tip 14 from the bearing points 12, 13 also determines the total path length which the tip 14 covers on the path curve C. At the same time the path curve points C0 to C6 which correspond to the path points A0 to A6 or B0 to B6 are drawn in with the corresponding positions of the tip 14 and the sun visor 10. As for the fourth path curve P, FIG. 2A shows the course followed by tip 14 if the tip was on the imaginary extension of the straight line between the bearing points A0-B0. As can be seen from FIG. 2A, the lowering of the tip 14 in relation to the two supporting bearing points A0, B0 has the effect that the path curve C0-C3 is compressed considerably more than the comparable path curve segment P0-P3. The extent of the curvature of the path of movement of the tip 14 in particular for the first path segment (0-3) is also determined by the angle by which the top deviates upwards or downwards from the imaginary line (A0-B0). The position of the tip in relation to the imaginary line therefore also offers numerous potential applications for adapting the sun visor displacement path to different roof designs.

If the sun visor 10 is shifted from the out-of-use position to the in-use position, so that the front position 12 reaches the path curve point A1, the tip 14 moves towards the path curve point C1 with a slight downward curvature. Consequently the tip 14 moves towards the path curve point C1 approximately parallel to the front windscreen 16 of the motor vehicle (cf. FIG. 1). In comparison with the forward movement, the lowering movement of the tip 14 is smaller. The driver of the vehicle is thus accustomed to the extending movement of the sun visor 10, the tip 14 firstly moving away from him. The slight curvature of the path curve segment C0 to C1 is essentially determined by the slight convex curvature of the path curve A0 to A1. The rear bearing point 13 moves rising very nearly linearly on the guide curve B to the curve point B1. Movement of the sun visor 10 from the resting position is possible without great expenditure of force, due to the small rise and slight curvature of the guide curves A and B. The guide curve A overall follows an S-shaped course, the convex path curve segment A0 to A2 being ahead of the following more greatly curved concave segment A2 to A6. Guide curve A crosses guide curve B at point A1. From intersection point A1 the tip 14 to a greater degree moves downwards according to the greater convex curvature of the guide curve A from point C1 of the path curve. The downward movement continues downwards in an arc with a curvature, according to the course of the guide curve A corresponding to the curve segment A1 to A3. Until the path curve point C3 is reached, the tip 14 of the sun visor 10 moves slightly towards the driver. The guide curve B likewise retains the slight rise towards the curve point B3 without great curvature. The tip 14 of the sun visor 10 accordingly does not move in a straight line from the starting point C0 to the path curve point C3, but via the intermediate points C1 and C2 on a convex path, as illustrated in FIG. 2A.

The path curve point C3 on the path of movement C corresponds to a turning point. The turning point C3 divides the path curve C into two functional segments. The path curve segments C0 to C3 has the function of achieving dazzle protection as quickly as possible without startling the driver. At the same time the first path curve segment of the path of movement C (C0 to C3) characterises the extending movement of the sun visor 10 from the lining shell 19. In particular through the convexly curved path of movement C0 to C3 with the initial forward movement C0 to C1 there is the further advantage in addition to the advantage of avoiding a startling effect, that the opening area of the exit opening 22 can be kept small. I.e. the distance of the front edge 20 from the edge of the lining shell, against which the shoulder 23 of the sun visor 10 can strike, can be dimensioned considerably shorter than if the tip 14 of the sun visor 10 moves from the starting point C0 directly in a straight line to the turning point C3.

The greatest dazzle effect is obtained from the direction of view of the driver if the sun visor has the greatest possible angle of incidence downwards and the tip 14 is thus at the turning point C3. Consequently the sun visor 10 offers the greatest possible effective incidence area in the position of the turning point C3 in relation to the direction of view.

The second segment of the path movement C, which stretches from the turning point C3 to the end point C6, therefore has the function of adapting the sun visor 10 to the restriction of field of view actually necessary, reducing the greatest possible dazzle effect. The tip 14 of the sun visor 10 is swivelled from the lowest point C3 in the direction of the windscreen 16 approximately on a circular path. The turning point C3 is essentially achieved by the guide curve A opening out from the path curve point A3 into a more greatly curved concave path curve and the guide curve B from the path curve point B3 into a path curve with a very highly convex curvature. The second path curve segment (C3-C6) thus results from the superposition of the curvatures of the guide curves A and B from the path curve points A3 and B3.

Figure 2B:
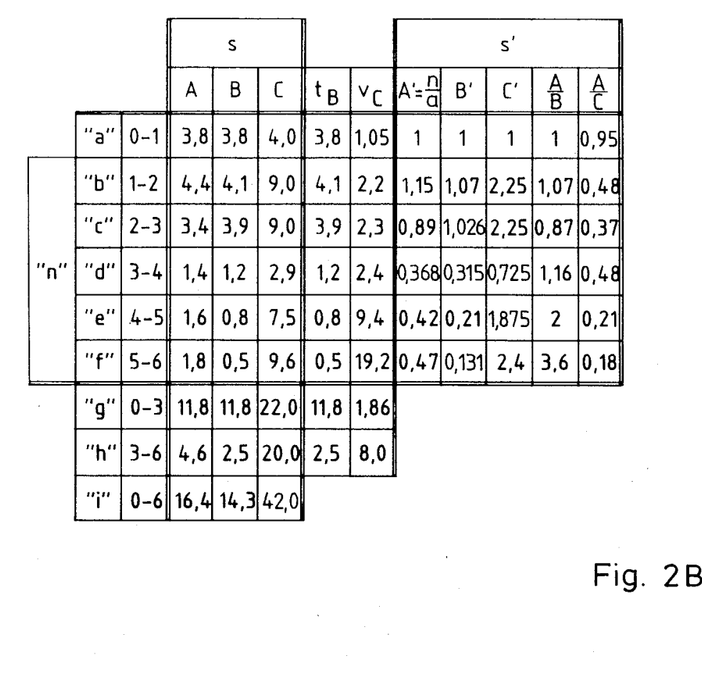
FIG. 2B is a table of the numerical recording and explanation of the embodiment.

The individual path curve segments are designated by lower case letters a to f in the Table shown as FIG. 2B. The numerical values in the column of the table which are designated by the upper case letters A, B and C correspond to the individual segments of the guide curves A, B and the path curve C in cm. The row "g" in the table also shows the total length of the individual path curve segments from the starting point 0 to the curve point 3. The total distance from the curve point 3 to the curve point 6 is listed in row "h". Row "i" designates the total length of the guide curves A, B and the path curve C in cm. For the guide curve A around $\frac{2}{3}$ of the total displacement distance is on the curve segment which stretches from the starting point 0 to the curve point 3, which corresponds to the turning point of the path curve C. Consequently around $\frac{1}{3}$ of the total distance remains for the guide curve A from the curve point 3 to the curve point 6. Deviating from this, for guide curve B around $\frac{3}{4}$ of the total displacement distance of the bearing point 13 is on the curve segment (0-3) and $\frac{1}{4}$ on the curved segment (3-6). The turning point C3 also divides the path curve C approximately in the middle, the second path curve segment (3-6) being only 2 cm shorter in the selected embodiment.

Reference is made to the following formulae I-V for the description of the velocity pattern of the tip 14 in the individual path curve segments (a-f; C):

$$V_B = \frac{S_B}{\Delta t_B} \quad (I)$$

$$\Delta t_B = \frac{S_B}{V_B} \quad (II)$$

$$V_B = 1 \text{ cm/s} \quad (III)$$

$$\Delta t_A = \Delta t_B = \Delta t_C \quad (VI)$$

$$V_C \approx \frac{S_C}{\Delta t_B} \quad (V)$$

The velocity pattern of the tip 14 is considered on the assumption that the drive engages at the bearing point 13 and shows as constant velocity of $V_B = 1$ cm per second (III).

The travel times for the individual path segments (a-f) of the guide curve B can be calculated according to formulae (I) and (II) with the assumed drive velocity $V_B = 1$ cm. The travel times of the bearing point 13 are summarised in the table under the $t_B$ column.

It is found from the numerical values indicated in the table (row "g") that the bearing points 12 and 13 of the sun visor 10 move as far as the curve point 3 at approximately the same velocity up to curve point 3. However, from curve point 3 the distances of the guide curves A and B (row "h") differ substantially from each other and the path segment (3-6) of the guide curve A is approximately twice as large in amount as the associated path curve segment of the guide curve B for the rear bearing point 13. Owing to the fixed distance between the front bearing point 12 and the rear bearing point 13, the front bearing point 12 can only pass through the associated longer path segment (3-6) on the guide curve A more quickly if the linear movement of the front bearing point 12 is overlaid by a velocity component which rotates the front bearing point 12 about a particular point. If the rear bearing point 13 moves on a straight line path, the rear bearing point 13 forms this centre of rotation for the front bearing point 12. As can be seen from FIG. 2A, the rear bearing point 13 moves as far as the curve point B3 very nearly in a straight line on the guide curve B and the rear bearing point 13 therefore forms in this path curve segment the centre of rotation for the front bearing point 12. From the curve point B3 of the guide curve B, the rear bearing point 13 runs through the path segment with a highly convex curvature (3-6), because of which the centre of rotation moves in the direction of the front bearing point 12. The centre of rotation is continuously displaced according to the pattern of the curvature of the guide curve A and B and divides the distance between the two bearing points 12, 13 into two lever arms, around which the bearing points 12, 13 rotate. As a result of the fixed coupling of the tip 14 of the sun visor 10 to the bearing points 12, 13 this rotational movement is transferred according to the distance of the tip 14 from the bearing points 12, 13 onto the front edge of the sun visor 10. Consequently the pattern of curvature of the first path curve segment (0-3) of the path curve C with the assumed rear drive results from the longitudinal shift of the bearing point 13 together with the bearing point 12 and the rotational movement of the front bearing point 12 about the rear bearing point 13. The rotational and swivelling movement of the bearing points 12, 13 is determined according to the pattern of curvature of the guide curve A to the curve point 3.

Without the convex bending of the path curve B in the segment (3-6) the lowest point for the front bearing point 12 and therefore the tip 14 would be at the curve point A4, because the curve point A3 is higher than the curve point A4. Because of the commencing convex curvature of the path curve B, the lowest point (C3) of the tip 14 is at the point at which the front bearing point 12 is on the curve point A3. The curve point C3 thus represents a reversal point or turning point in relation to the lowering movement of the tip 14. As the tip 14 approaches the turning point C3 from the curve point C2, the tip 14 is lowered and as it moves away from the curve point C3 in the direction of the curve point C4, the tip 14 is raised again. Alongside the height movement of the tip 14 in relation to the direction of view of the driver, the curve point C3 at the same time represents a reversal or turning point for the longitudinal shift of the tip 14 of the sun visor 10. If the tip 14 in turn moves from the curve point C2 onto the turning point C3, a movement of the tip 14 takes place in the direction of the driver of the motor vehicle. On the other hand, the tip 14 moves away from the driver when the turning point C3 is exceeded. A reversal of direction accordingly occurs at the turning point C3 in the movement of the tip 14 in the height position and in the longitudinal shift. The turning point C3 thus forms a dead point at which the tip 14 is stationary for a brief moment.

Although it is possible that the front bearing point 12 is moved on a longer guide path and therefore with a high curve velocity in the movement of the rear bearing point 13, when the rear bearing point 13 is stationary the front bearing point 12 must also come to a halt. If the front bearing point 12 was still to move when the rear bearing point 13 has come to a halt, this could only be achieved by the front bearing point 12 describing a circular path about the rear bearing point 13. This circular path movement of the front bearing point 12 would, however, result in flapping of the tip 14. The sense and purpose of the curve paths A and B in accordance with the invention, however, is to displace the sun visor 10 free from play without flapping and rattling at the tip 14. This is only possible if the bearing points 12, 13 come to a halt simultaneously in the two resting points (0, 6). Because of the required drive of the rear bearing point 13 and the differing length curve paths A and B, it is therefore also necessary for the front bearing point 12 to reach the final position A6 simultaneously with the arrival of the rear bearing point 13 at the associated final position B6. As the bearing points 12, 13 jointly reach the end points A6, B6, which corresponds to the sun visor 10 coming to a halt, the tip 14 must also come to a halt. Consequently the total travel times for the two bearing points 12, 13 and the tip 14 of the sun visor 10 are equal in amount.

If the bearing point 13 is set in motion with the assumed velocity of 1 cm per second, the rear bearing point 13 pushes the front bearing point 12 ahead of it via the fixed coupling through the sun visor body of the sun visor 10. As a result of the forced guidance of the two bearing points 12, 13 in the curve paths A and B due to the fixed coupling of the two bearing points 12, 13, the front bearing point 12 requires the same period of time to reach the individul path curve points A0–A6 which the rear bearing point 13 requires to reach the associated path curve points B0–B6. The two bearing points 12, 13 being stationary necessarily leads to the tip 14 coming to a halt. Conversely the tip 14 being stationary, as at the turning point C3, does not necessarily mean that the bearing points 12, 13 have to be stationary. For example the bearing points 12, 13 and the tip 14 in order to run through the path curve distance (4–5)—row "e" in this embodiment—require a period of 0.8 seconds. consequently the tip 14 has a velocity of $V_C = 9.4$ cm per second in order to cover the distance of 7.5 cm in 0.8 seconds. The individual velocities are indicated in the $V_C$ column in a similar manner for the other path curve segments "a" to "f". Starting from the assumed advance velocity of 1 cm per second for the rear bearing point 13, it is found that the velocity of movement of the tip 14 in the path curve segment (0–3) which reaches to the turning point C3, is substantially lower than the velocity of movement of the tip 14 from the turning point C3 to the end point C6.

The velocities indicated in the table according to FIG. 2B in the $V_C$ column represent approximate velocities, because a straight line movement was assumed. The accuracy of the velocity data between the individual path curve segments can be increased by making the path curve segments considerably shorter than described. The columns headed "s" in the table according to FIG. 2B designate numerical values of an embodiment given by way of example. The columns headed "s" designate standardised path curve values. The path curves A', B', C' are related to the associated first path curve segment (row "a", columns A, B, C). The numerical values for the column "B" are therefore calculated from the following numerical values in column "B": 3.8/3.8=1; 4.1/3.8; 3.9/3.8; 1.2/3.8; 0.8/3.8; 0.5/3.8=0.131.

The path curve segment (5–6) likewise corresponds e.g. to 2.4 times the value of the path curve segment (0–1) of the path curve C.

The path curve B in the fourth s' column and the path curve C in the fifth s' column are also related to the path curve A. The path curve segment "e" of the path curve A is e.g. twice as long as the associated path curve segment of the curve B. This is made clear in the fourth s' column by the factor "2".

Figure 3:
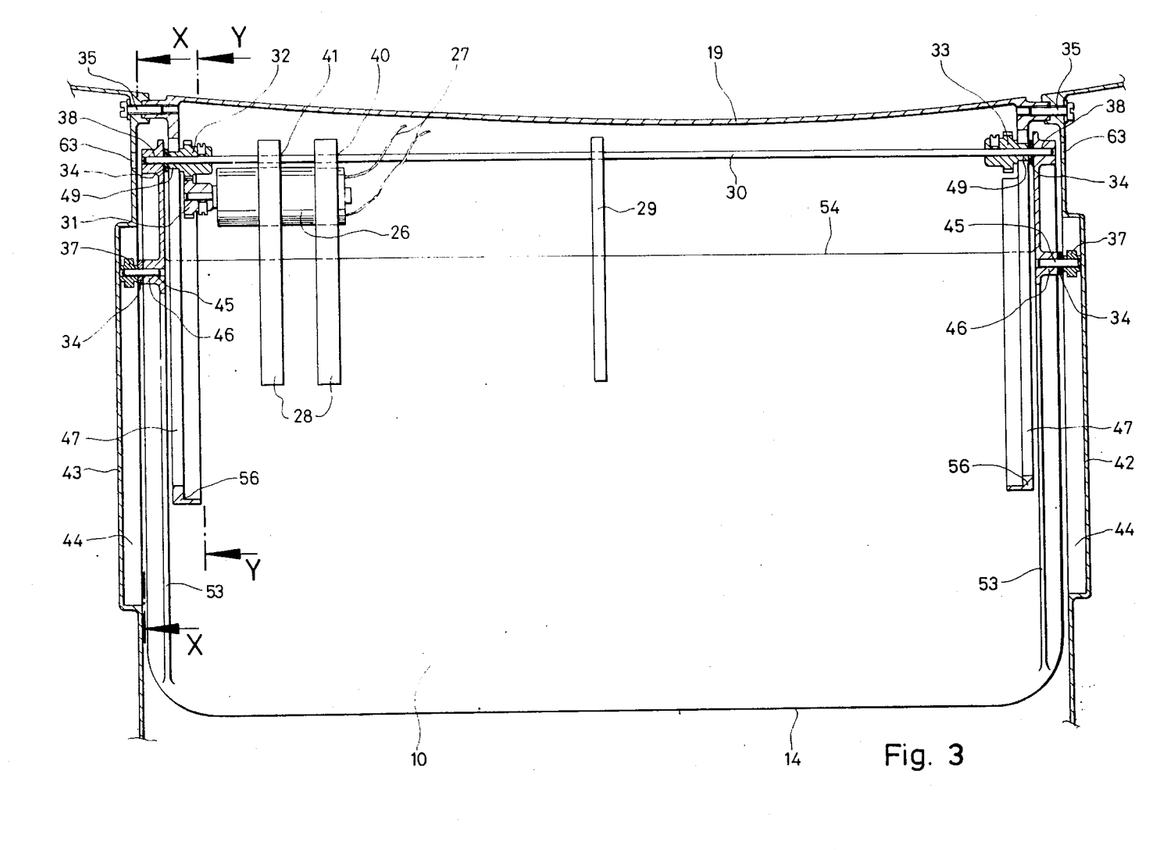
FIG. 3 is a plan view of the roof area with the sun visor shown in FIG. 1, which is supported in a guide mechanism.

FIG. 3 shows a cut-away picture of the roof area of the motor vehicle with the sun visor 10 of FIG. 1, which is supported in a guide mechanism in accordance with the invention. FIG. 3 shows the top view of the sun visor 10 with the direction of view into the interior of the vehicle. Stiffening bars 53 are formed at the lateral edges of the sun visor 10. The stiffening bars 53 stretch from the area of the front edge or tip 14 at the top of the sun visor 10 to the area of the sun visor body, in which the bearing points 12, 13 are formed. The axle journals of the front bearing points consist of bearings pins 45 and guide rollers 37. The bearing pins 45 are pressed into pin holders 46 which are formed at the stiffening bars 53 pointing outwards. Spacer discs 34 are provided between the pin holders 46 and the guide rollers 37. The guide rollers 37 and are rotatably supported on the bearing pins 45.

The rear bearing points 13 in turn are formed at the stiffening bars 53 by providing a bearing hole 38. The bearing holes 38, the pin holders 46, the stiffening bars 53 and the sun visor 10 are for example injected in one piece out of plastics. The bearing holes 38 and the pin holders 46 can be formed in a simple manner by material thickening at the outsides of the stiffening bars 53. In contrast to the pin holders 46 the hole in the bearing holes 38 is so dimensioned that an inserted drive shaft 30 is supported in a smooth rotatable manner. The drive shaft 30 engages with its free ends in the opposite bearing hole 38, the drive shaft 30 being aligned parallel to the front edge or tip 14 of the sun visor 10. Although the bearing pins located ahead of the drive shaft 30 consist of individual pins 45, they are so aligned that they lie on a common imaginary line which in turn runs parallel to the drive shaft 30. The two front bearing points 12 and the two rear bearing points 13 disposed on the lateral edges of the sun visor 10 thus form a front and a rear pair of bearing points each lying on an axis. The sun visor 10 is accordingly supported in a carriage shape at four points.

Figures 4, 5:
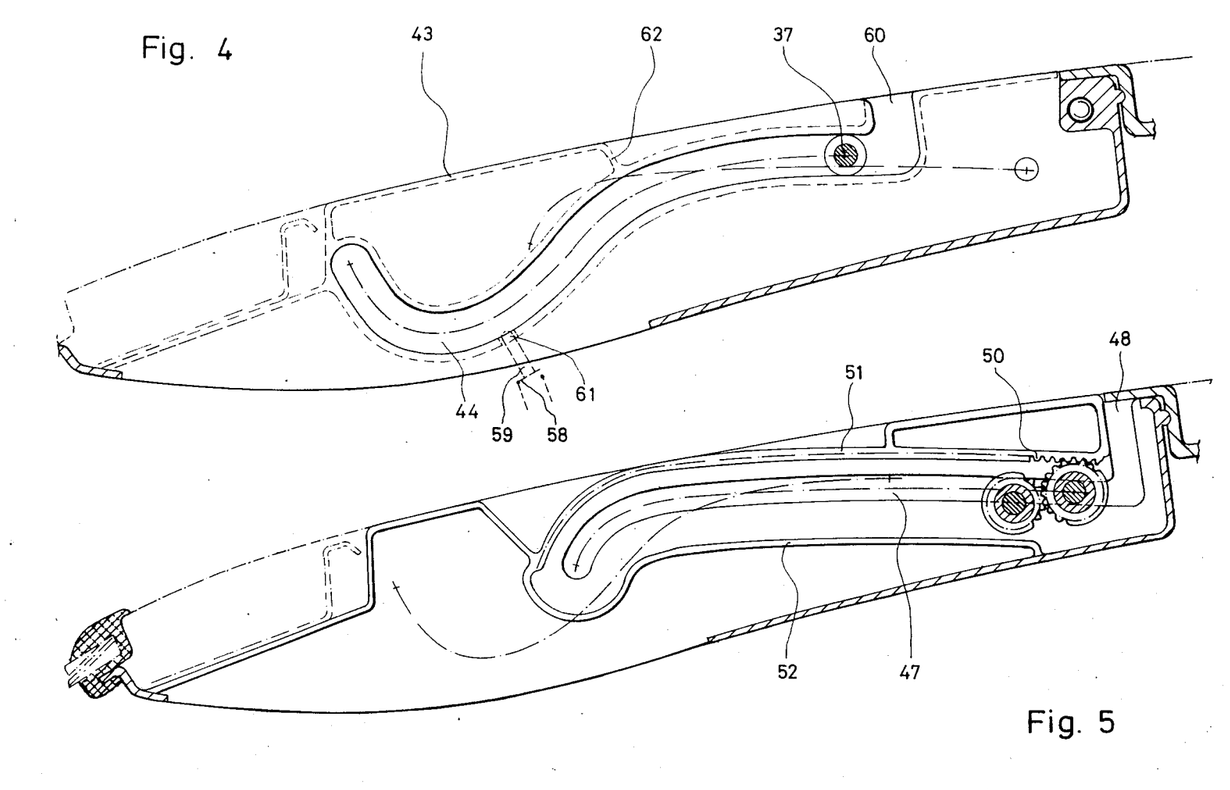
FIG. 4 is a section through the guide mechanism of the guide curve A taken along the line X—X in FIG. 3.
FIG. 5 is a section through the guide mechanism of the guide curve B taken along the line Y—Y in FIG. 3.

The front pair of bearing points 12 runs with the guide rollers 37 in a link path or groove curve 44, which forms the guide curve A in the side view. The groove curves 44 are let into a right-hand car body wall 42 and a left-hand car body wall 43 in FIG. 3. FIG. 4 shows a section along the line of cross-section X—X in FIG. 3 along the left-hand car body wall 43. The guide curves A and B are illustrated in FIG. 4 as dash-dot lines, the guide curve B only being indicated to clarify the position in relation to the guide curve A. The width of the groove curve 44 is matched to the diameter of the guide roller 37 and extends symmetrically to the pattern of curvature of the guide curve A. In the position shown in FIG. 4 the guide roller 37 is in the initial position, to which the curve point A0 corresponds. The initial position B0 of the rear bearing point 13 and the end position A6 of the guide roller 37 are also indicated.

The groove curve 44 is formed for example by deep drawing in the car body walls 42, 43. The groove curve 44 is terminated at the end by a wall segment in the shape of an arc of circle which is matched in pattern of curvature and diameter to the guide roller 37. The groove curves have an inlet opening 60 for the introduction of the guide rollers 37 into the groove curves 44 which in FIG. 4 by way of example points upwards. The sun visor 10 can thus be suspended in the groove curves 44 with the guide rollers 37 which form the front pair of bearing points 12 without swivelling and tilting. In other applications the insertion opening 60 can open into the groove curve 44 orientated differently than illustrated. A stiffening bar 62 is provided for stability and against twisting, engaging with the wall of the groove curve 44 over around half the length of the guide path A.

It is possible for example to provide a break-through 61 at the bottom of the wall of the groove curve 44 in the area of suitable path curve points. The break-through 61 is used to receive the cam (cf. FIG. 1) which engages with the switch 58. As well as securing the switch 58 for detecting the initial and final positions of the guide roller 37, the wall of the groove curve 44 is equally suitable for detecting the position of the guide curves 37 within the course of the path curve. The position of the break-through 61 shown in FIG. 4 corresponds e.g. to the path curve point A3 and therefore to the turning point C3 of the tip 14 of the sun visor 10. If the guide roller 37 is moved via the cams 59, the switch 58 is actuated. The activation of the switch 58 can be utilised to increase or decrease the speed of a drive described below with an electric motor. It is thus possible by means of the switch 58 not only to move the sun visor 10 at a constant velocity in the groove curve 44, but to endow the sun visor 10 in the individual path segments with different advance and withdrawal speeds. The position of the switch 58 shown in FIG. 4 can for example be utilised to carry out the swivelling movement of the tip 14 of the sun visor 10 from the turning point C3 at a lower speed than the extending movement to the turning point C3.

A left-hand shaft pinion 32 and a right-hand shaft pinion 33 are moved safe against rotation in the area of the axle ends on the continuous drive shaft 30 (cf. FIG. 3). The rear edge 54 of the sun visor 10 ends in the area of the front pair of bearing points. The drive shaft 30 is consequently supported by the free ends of the stiffening bars 53. In order to prevent deflection of the drive shaft 30, which essentially extends over the entire width of the sun visor 10, a step bearing 29 is provided which extends from the middle of the sun visor via the rear edge 54 out to the drive shaft 30. A drive shaft 26 which is secured in two motor mountings 28 similar to the step bearing 29 is provided in the space between the drive shaft 30 and the rear edge 54 of the sun visor 10. The motor mountings 28 in turn extend beyond the rear edge 54 to the drive shaft 30, and the free ends of the motor mounts 28 in turn have bearing holes 40, 41 to receive the drive shaft 30. The relatively heavy motor 27 is thus suspended in the space at the rear edge 54 and is supported by the axle 30 and the sun visor 10 via the transverse motor mountings 28.

A drive pinion 31 is attached on the axis of the motor 26. The drive pinion 31 engages with the left-hand shaft pinion 32. If power is supplied to the motor 26 via the connecting leads 27, the drive pinion 31 drives the left-hand shaft pinion 32 and therefore the drive shaft 30. Because of the continuous drive axle 30, the right-hand shaft pinion 33 turns together with the left-hand shaft pinion 32. The two shaft pinions 32, 33 additionally have a pinion journal 49 with a smaller diameter than the diameter of the shaft pinions 32, 33. The pinion journals 49 are directed via spacer discs 34 at the bearing holes 38, in which the drive shaft 30 rotates. The pinion journals 29 are on a link path or groove curve 47, which extends as a rod-shaped component 56 of the lining shell 19 from the drive shaft 30 in the direction of the sun visor 10.

The rod-shaped component 56 of the lining shell 19 is illustrated in FIG. 5 in a section along the line of cross-section Y—Y from FIG. 3. The guide curves A and B are again indicated by dash-dot lines in FIG. 5. The groove curve 47 stretches along the guide curve B and has a width which corresponds to the diameter of the pinion journal 49. The groove curve 47 forms a slit in the wall of the rod-shaped component 56 so that the drive axle 30 can extend to the bearing holes 38. An insertion segment with an insertion opening 48 similar to the opening 60 (cf. FIG. 4) is again provided at the initial position of the groove curve 47 for the insertion of the pinion journals 49. The groove curve 47 is likewise matched in the final position to the rounding of the pinion journals 49.

In order to insert the lining shell 19 the two rod-shaped components 56, both of which are also disposed in the lateral area of the sun visor 10, are pushed with their free ends ahead through the space clamped by the drive shaft 30 and the rear edge 54. The lining shell was suspended beforehand with the insertion openings 48 onto the pinion journals 49. As a deviation from this, they can be assembled by the drive shaft 30 after insertion of the lining shell through holes 63 being pushed into the car body walls 42, 43 and secured. After the insertion of the parts and positioning, the lining shell 39 is attached to the car body wall via fastening screws 35 (FIG. 4).

As so far described, the sun visor 10 is movably supported in the groove curves 44, 47. Accordingly the guide roller 37 forms together with the groove curve 44 the front bearing point 12 and the pinion journal 49 together with the groove curve 47 the rear bearing point 13. An upper and a lower wall 51, 52 are formed at the wall formed by the groove curve 47, which engages over both pinions 32, 33. Teeth 50 are formed at the upper wall 51 which engage with the shaft pinions 32, 33. The teeth 50 show a pattern of curvature which is matched to the guide curve B or the groove curve 47. If the shaft pinions 32, 33 are set in motion via the motor 31, their teeth mesh in the teeth 50, which with the corresponding direction of rotation has the result that the sun visor 10 is pushed forward to back in the groove curves. Because the teeth are matched to the guide curve B in their pattern of curvature, an identical distance from the teeth exists at all points of the path curve, for which reason the engagement between the teeth 50 and the teeth of the shaft pinions 32, 33 cannot be lost. The lower wall 52 of the rod-shaped component 56 of the lining shell 19 does not have any teeth and therefore terminates in the end area B6 of the path curve B as a trough shaped against the upper wall 51. As not recognisable in FIG. 3 because of the cross-sectional illustration, it is possible in order to further increase the stability of the rod-shaped components 56 to connect their free ends by a transverse bar. Since the rod-shaped components 56, the step bearing 29 and the motor 26 with the motor mountings 28 are disposed on the top and on the rear area of the sun visor 10, these parts are covered from the inside of the drive compartment by the lining shell 19 and are not visible. The drive shaft 30 and the motor 26, which is moved together with the sun visor 10, are likewise covered by the lining shell 19. As a result of the distance of the pinion journals 49 at the two shaft pinions 32, 33 being shorter than the distance of the two external guide rollers 37 or because the groove curves 47 together with the teeth 50 are disposed between the external groove curves 44, it is possible to select the intersecting course of the guide curves A and B as in FIG. 2A.

I claim:

1. A movable sun visor consisting of a sun visor body, which is supported in a carriage in lateral side guide curves via a rear pair of bearing points which are oppositely formed at the lateral edges in the area of a rear edge of the sun visor body, and a front pair of bearing points, which are oppositely formed at the lateral edges between the rear pair of bearing points and a front edge of the sun visor body, there being two equal guide curves for the front pair of bearing points which differ in the pattern of curvature of and being longer than two equal guide curves which are provided for the rear pair of bearing points, and the first pair of guide curves (A) for the front pair of bearing points follows an S-shaped course with a convex curvature in a first set of path segments (A0, A1 and A2), and a concave curvature in a second set of path segments (A3, A4, A5 and A6), and the second pair of the guide curves (B) for the rear pair of bearing points has a convex curvature over the entire length of the curve, wherein the greatest curvature of the guide curve (B) for the rear pair of bearing points is formed in a set of path segments (B3, B4, B5 and B6), which correspond to the second set of path segments (A3, A4, A5 and A6) on the guide curve (A) for the front pair of bearing points.

2. A sun visor according to claim 1, wherein the curve length of the first set of path segments is greater than the curve length of said set of path segments of the guide curve for the rear pair of bearing points.

3. A sun visor according to claim 1, wherein the guide curves for the front and rear bearing points intersect.

4. A sun visor according to claim 1, wherein an electric motor is disposed in the sun visor body which is connected via a pinion mechanism to teeth which are formed on one of the pairs of guide curves and matched to the curvature of that guide curve.

5. A sun visor according to claim 4, wherein a transmission shaft is provided which carries the pinions and which forms the bearings of the rear pair of bearing points.

6. A sun visor according to claim 5, wherein the transmission shaft is supported in bearing holes which are formed on the sun visor body.

7. A sun visor according to claim 6, wherein the bearing holes and bearings which form the bearing points of the front pair of bearing points are formed in the area of the rear edge of the sun visor body on stiffening bars.

8. A sun visor according to claim 4, wherein sensor elements are provided which detect the initial and final positions of the sun visor body.

9. A sun visor according to claim 8, wherein stop cushioners, in particular rubber buffers, are provided for the initial and final positions of the sun visor body.

10. A sun visor according to claim 1, wherein said first pair of guide curves for the front pair of bearing points are spaced to a greater distance than the guide curves for the rear pair of bearing points and said second pair of guide curves are disposed between said first pair of guide curves.

11. A sun visor according to claim 10, wherein said first guide curve is formed in the car body wall and said second guide curve in the lateral wall of a lining shell.

12. A sun visor according to claim 1, wherein the path segments (0-1), (1-2), (2-3), (3-4), (4-5), (5-6) of said second guide curve are in the following ratio to the associated path segments of said first guide curve: 1:1.07; 1:0.87; 1:1.16; 1:2; 1:3.6.

13. A sun visor according to claim 1, wherein the path segment (0-1), (1-2), (2-3), (3-4), (4-5), (5-6) of movement path C are in the following ratio to the associated path segments of said first guide curve: 1:0.95; 1:0.48; 1:0.37; 1:0.48; 1:0.21; 1:0.18.

14. Movable sun visor consisting of a sun visor body, which is supported in a carriage shape in lateral side guide curves via a rear pair of bearing points, the two bearing points of which are formed opposite at the lateral edges in the area of the rear edge of the sun visor body, and a front pair of bearing points, the two bearing points of which are formed opposite at the lateral edges between the rear pair of bearing points and the front edge of the sun visor body, the two equal guide curves for the bearing points of the front pair of bearing points differing in the pattern of curvature and the length of the two equal guide curves for the bearing points of the rear pair of bearing points, and the guide curve for the front pair of bearing points being longer than the guide curve for the rear pair of bearing points, characterised in that the guide curve (A) for the bearing points (12) of the front pair of bearing points follows an S-shaped course, that the guide curve (a) has a convex curvature in the path segments (A0, A1 and A2), that the guide curve (A) has a concave curvature in the path segments (A3, A4, A5 to A6), that the guide curve (B) for the bearing points (13) of the rear pair of bearing points has a convex curvature over the entire length of the curve, and that the greatest curvature of the guide curve (B) is formed in the path segments (B3, B4, B5 to B6), which correspond to the associated path segments (A3, A4, A5 to A6) on the guide curve (A).

* * * * *